(12) United States Patent
Share et al.

(10) Patent No.: US 8,308,976 B2
(45) Date of Patent: Nov. 13, 2012

(54) OXYGEN-SCAVENGING MATERIALS AND ARTICLES FORMED THEREFROM

(75) Inventors: Paul Share, Wexford, PA (US); Jeffrey Niederst, Leechburg, PA (US); Richard Evans, Wexford, PA (US); Grant Schutte, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/123,396

(22) PCT Filed: Oct. 10, 2008

(86) PCT No.: PCT/US2008/079618
§ 371 (c)(1),
(2), (4) Date: May 16, 2011

(87) PCT Pub. No.: WO2010/042125
PCT Pub. Date: Apr. 15, 2010

(65) Prior Publication Data
US 2011/0259778 A1    Oct. 27, 2011

(51) Int. Cl.
C09K 3/00 (2006.01)
B65D 81/00 (2006.01)
(52) U.S. Cl. .................... 252/188.28; 206/524.1
(58) Field of Classification Search ............ 252/188.28
See application file for complete search history.

(56) References Cited

U.S. PATENT DOCUMENTS

| | | | |
|---|---|---|---|
| 1,969,709 A | 8/1934 | Bruson et al. |
| 4,075,143 A | 2/1978 | Schelhaas et al. |
| 5,021,515 A | 6/1991 | Cochran et al. |
| 5,211,875 A | 5/1993 | Speer et al. |
| 5,324,350 A | 6/1994 | Bender et al. |
| 5,346,644 A | 9/1994 | Speer et al. |
| 5,350,622 A | 9/1994 | Speer et al. |
| 5,399,289 A | 3/1995 | Speer et al. |
| 6,083,585 A | 7/2000 | Cahill et al. |
| 6,254,804 B1 | 7/2001 | Matthews et al. |
| 6,255,248 B1 | 7/2001 | Bansleben et al. |
| 6,410,156 B1 | 6/2002 | Akkapeddi et al. |
| 6,515,067 B2 | 2/2003 | Cai et al. |
| 6,525,123 B1 | 2/2003 | Yang et al. |
| 6,559,205 B2 | 5/2003 | Cai et al. |
| 6,777,496 B2 | 8/2004 | Patel et al. |
| 6,818,151 B2 | 11/2004 | Yang et al. |
| 6,878,774 B2 | 4/2005 | Kikuchi et al. |
| 6,946,175 B2 | 9/2005 | Yang et al. |
| 7,238,300 B2 | 7/2007 | Solis et al. |
| 7,247,390 B1 | 7/2007 | Yang et al. |
| 7,390,569 B2 | 6/2008 | Kitano et al. |
| 2002/0072476 A1 | 6/2002 | Yoshida et al. |
| 2003/0036486 A1 | 2/2003 | Kodali |
| 2003/0152727 A1 | 8/2003 | Jerdee et al. |
| 2003/0218152 A1 | 11/2003 | Yang et al. |
| 2005/0085577 A1 | 4/2005 | Ching et al. |
| 2005/0104033 A1 | 5/2005 | Schmidt et al. |
| 2006/0202161 A1 | 9/2006 | Share et al. |
| 2006/0276368 A1 | 12/2006 | Speer et al. |
| 2008/0090042 A1 | 4/2008 | Kitahara |
| 2009/0014687 A1 | 1/2009 | Kaskel et al. |
| 2010/0051862 A1 | 3/2010 | Share et al. |

FOREIGN PATENT DOCUMENTS

| | | |
|---|---|---|
| EP | 1553137 A1 | 7/2005 |
| EP | 1666925 A1 | 6/2006 |
| JP | 04063810 A | 2/1992 |
| JP | 2001042115 A | 2/2001 |
| JP | 2001072115 A | 3/2001 |
| JP | 2005008699 A | 1/2005 |
| JP | 2006206744 A | 8/2006 |
| WO | WO2005037925 A1 | 4/2005 |

OTHER PUBLICATIONS

Office communication for copending U.S. Appl. No. 12/594,909 mailed on Dec. 8, 2011 (11 pages).
International Search Report and Written Opinion for PCT/US2008/059562 dated Jun. 23, 2008 (16 pgs).
International Search Report and Written Opinion for PCT/US2008/079618 dated Dec. 15, 2008 (7 pgs).
International Search Report and Written Opinion for PCT/US2008/079532 dated Dec. 2008 (8 pgs).

*Primary Examiner* — Peter F Godenschwager
(74) *Attorney, Agent, or Firm* — Brian R. Morrison; Westman, Champlin & Kelly, P.A.

(57) ABSTRACT

An oxygen-scavenging composition is provided that includes an oxygen-scavenging component and a catalyst. The oxygen-scavenging component, which in preferred embodiments is suitable for use in packaging articles, includes two or more oxygen-scavenging groups having different scavenging properties. In one embodiment, one of the oxygen-scavenging groups is an unsaturated bicyclic group.

20 Claims, 1 Drawing Sheet

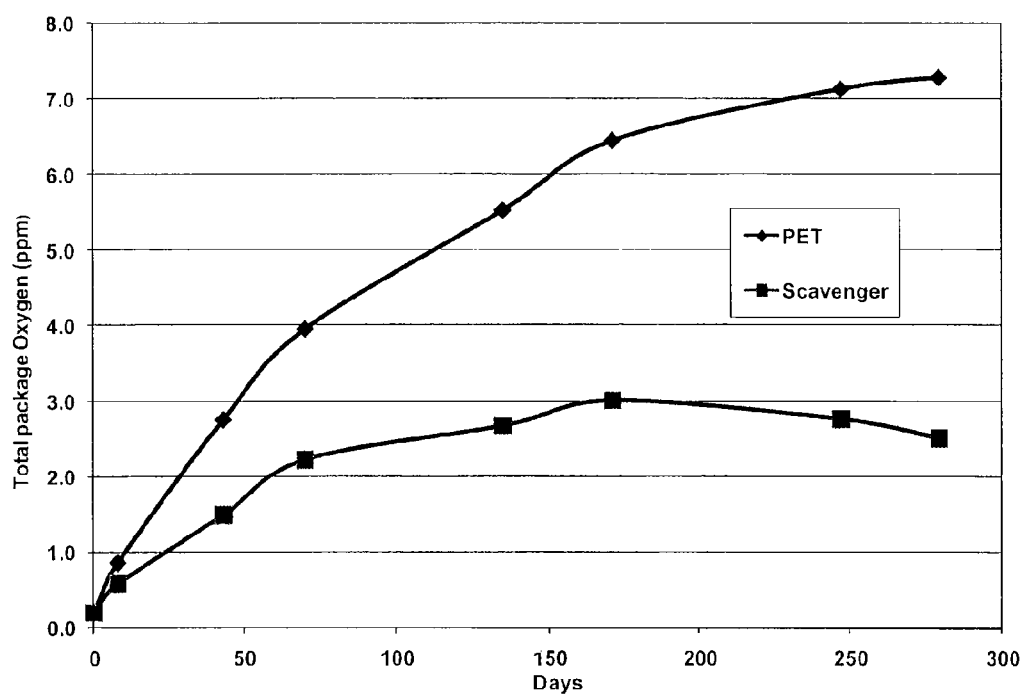

phrase# OXYGEN-SCAVENGING MATERIALS AND ARTICLES FORMED THEREFROM

CROSS-REFERENCE TO RELATED APPLICATIONS

This application is the National Stage filing under 35 U.S.C. 371 of International Application No. PCT/US2008/079618 filed on Oct. 10, 2008, and entitled "Oxygen-Scavenging Materials and Articles Formed Therefrom," which is incorporated herein by reference in their entirety.

TECHNICAL FIELD

This invention relates to oxygen-scavenging materials and articles formed therefrom.

BACKGROUND

Historically, oxygen-sensitive products have been packaged and shipped in either glass or metal containers for delivery to the consumer. These containers have essentially zero gas permeability and, as such, the oxygen-sensitive products are able to remain fresh for an extended period of time.

There is a growing desire to package certain products such as, for example, foods and beverage products, in various plastic (e.g., PET, HDPE, PP, etc.) containers, wrapping, and other packaging articles. Compared to glass or metal packaging, plastic packaging is typically cheaper, more resistant to breakage, and more flexible (if desired). Conventional plastics, however, have generally functioned poorly at blocking oxygen passage relative to other available materials, such as glass or metal. The permeability of conventional plastics to oxygen transmission can result in short product shelf life, especially for products that are sensitive to degradation when exposed to oxygen.

Oxygen-scavenging materials have been incorporated into plastic containers in an attempt to maintain a low level of oxygen within the container, thereby extending the shelf life of the product. These plastic containers, however, have typically suffered from one or more deficiencies such as loss of adhesion, delamination, presence of off tastes or odors in products packaged therein, poor clarity, cost (e.g., material, storage, and/or transportation costs), insufficient oxygen-scavenging capacity and/or shelf life, and inefficient or untimely activation of oxygen scavenging.

Thus, there is a continuing need for improved oxygen-scavenging materials for use in packaging articles.

SUMMARY

In one aspect, the invention is an oxygen-scavenging composition suitable for use in a variety of applications including, for example, in packaging articles. In some embodiments, the oxygen-scavenging composition includes a "fast" OS group such as, for example, an oxygen-scavenging component (preferably including at least one oxygen-scavenging polymer) which includes a bicyclic oxygen-scavenging group preferably having at least one double bond located between atoms of a ring. The oxygen-scavenging component preferably further includes one or more additional oxygen-scavenging groups that preferably have a scavenging property different from that of the aforementioned bicyclic group. In one embodiment, the one or more additional oxygen-scavenging groups comprise (i) a polyamide group, (ii) an unsaturated group, (e.g., a cyclohexene group) that includes at least one carbon-carbon double bond preferably having a heat of hydrogenation of less than about 32 kcal/mole, or (iii) a mixture thereof.

In some embodiments, the oxygen-scavenging component includes a first oxygen-scavenging group and a second oxygen-scavenging group, wherein the first oxygen-scavenging preferably comprises a cyclic or bicyclic oxygen-scavenging group having at least one carbon-carbon double bond located between atoms of a ring. The carbon-carbon double bond of the unsaturated cyclic or bicyclic group preferably has a heat of hydrogenation of at least 33 kcal/mole. The cyclic or bicyclic group is preferably included in a polymer, more preferably a polymer having a condensation backbone such as, for example, a polyester backbone. The second oxygen-scavenging group preferably comprises a group selected from (i) a structural unit represented by the formula -arylene-C(HR$^1$)—N(R$^2$)—(C=O)—, wherein R$^1$ and R$^2$ preferably independently denote one of a hydrogen atom, a substituted or unsubstituted alkyl group, a substituted or unsubstituted cycloalkyl group, a substituted or unsubstituted aryl group, or a substituted or unsubstituted alkenyl or cycloalkenyl group, or (ii) an unsaturated oxygen-scavenging group that includes at least one carbon-carbon double bond with a heat of hydrogenation of 32 kcal/mole or less.

In another aspect, the invention provides methods for making the oxygen-scavenging composition described herein. In one embodiment, a Diels-Alder reaction is used to form a bicyclic oxygen-scavenging group included in the oxygen-scavenging component of the composition.

In another aspect, the invention provides articles that include oxygen-scavenging compositions described herein. In some embodiments, the articles comprise monolayer or multilayer packaging articles.

The above summary of the invention is not intended to describe each disclosed embodiment or every implementation of the invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and drawings and the claims.

DEFINITIONS

Unless otherwise specified, the following terms as used herein have the meanings provided below.

The term "organic group" means a hydrocarbon group (with optional elements other than carbon and hydrogen, such as oxygen, nitrogen, sulfur, and silicon) that is classified as an acyclic group, cyclic group, or combination of acyclic and cyclic groups (e.g., alkaryl and aralkyl groups). The term "acyclic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" refers to a group that contains one or more closed ring hydrocarbon groups, which can include heteroatoms and/or one or more pendant groups, including, e.g., ring and/or non-ring (e.g., acyclic) pendant groups. The term includes any type of substituted or unsubstituted ring hydrocarbon group, including, for example, bicyclic groups and fused ring groups. The term "bicyclic group" refers to a group that includes at least two closed ring hydrocarbon groups, which can include heteroatoms, that share at least two bonds and three atoms. Nobornene (also referred to as bicyclo[2.2.1]heptene) is an example of a bicyclic group. The term "fused ring group" refers to a closed ring hydrocarbon group, which can include heteroatoms, that includes at least two rings that share one bond and two atoms. Napthalene is an example of a fused ring group.

A group that may be the same or different is referred to as being "independently" something. Substitution is anticipated on the organic groups of the compounds of the invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The disclosure of a particular group herein is intended to be an explicit disclosure of both the group and the corresponding moiety. Thus, disclosure of an "alkyl group" is also explicit disclosure of the "alkyl moiety" included therein.

The term "component" refers to any compound that includes a particular feature or structure. Examples of components include compounds, monomers, oligomers, polymers, and organic groups contained therein.

The term "double bond" is non-limiting and refers to any type of double bond between any suitable atoms (e.g., C, O, N, etc.).

The term "triple bond" is non-limiting and refers to any type of triple bond between any suitable atoms.

The term "conjugated diene component" refers to a component that includes at least two conjugated double bonds, each of which can be any type of double bond. Thus, for example, a component that includes a —CH═CH—CH═CH—CH═CH— structure constitutes a conjugated diene component even though it includes 3 or more double bonds.

The term "cyclic conjugated diene component" refers to a conjugated diene component having at least one ring that includes at least one conjugated double bond located therein. The one or more other conjugated double bonds, for example, may also be located on the ring and/or may be located in a group attached to the ring.

The term "unsaturated component" refers to a component that includes at least one double bond or triple bond.

The term "cyclopentadiene" includes both cyclopentadiene and dicyclopentadiene.

The term "cyclopentadiene component" refers to a component that contains a substituted or unsubstituted cyclopentadiene group, and encompasses both cyclopentadiene and dicyclopentadiene.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The term "food-contact surface" refers to a surface of an article (e.g., a food or beverage container) that is in contact with, or suitable for contact with, a food or beverage product.

The term "comprises" and variations thereof do not have a limiting meaning where these terms appear in the description and claims.

The term "oxygen scavenging" means absorbing, consuming, or reducing the amount of oxygen from a given environment.

The term "packaging article" as used herein includes both packaging articles in their final commercial form, as well as any intermediate stages. Preforms, which are frequently formed for plastic containers and other packaging articles, are one example of such an intermediate stage. The term includes at least films, bottles, containers, closures, closure liners, etc.

The terms "preferred" and "preferably" refer to embodiments of the invention that may afford certain benefits, under certain circumstances. However, other embodiments may also be preferred under the same, or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

BRIEF DESCRIPTION OF THE DRAWINGS

FIG. 1 is a graph which shows the concentration of oxygen (over time) present in (i) a sealed PET beverage bottle having a monolayer sidewall containing about 1 weight percent (wt-%) MXD6 nylon and 12 ppm cobalt neodecanoate (corresponds to "Scavenger" plot) relative to that of (ii) a sealed control PET beverage bottle having no scavenger materials (corresponds to "PET" plot).

DETAILED DESCRIPTION

The invention provides an oxygen-scavenging composition ("OS composition") that preferably includes two or more oxygen-scavenging groups ("OS Groups") and/or materials that exhibit one or more different oxygen-scavenging properties. The invention further provides coating compositions and articles, including, for example, articles for packaging oxygen-sensitive products, which include one or more layers of the oxygen-scavenging composition of the invention. Examples of such packaging articles may include flexible or rigid articles for packaging oxygen-sensitive products such as oxygen-sensitive food or beverage products, medical products, computer parts, electrical parts, or other materials sensitive to oxygen. It is further contemplated that OS compositions of the invention may be used in non-packaging applications where oxygen-scavenging properties are desired.

MXD6 nylon (from Mitsubishi), in combination with an oxidation catalyst, is a common oxygen-scavenging material for use in packaging articles. We have observed that packaging articles containing MXD6 nylon, which has not been pre-activated (i.e., activated prior to product packaging, e.g., during manufacture and/or storage of a packaging article), tends to exhibit a "slow" initial rate of oxygen scavenging upon product packaging relative to the rate of oxygen-scavenging exhibited after activation has been fully achieved. Once activation has been fully achieved, MXD6 nylon typically exhibits a robust and stable oxygen-scavenging capability for an extended period of time. The comparatively "slow" initial rate of oxygen-scavenging for MXD6 nylon, however, may be potentially problematic for products that are especially sensitive to oxygen. Other conventional OS materials may also suffer from similar drawbacks prior to the oxygen-scavenging properties of the materials being fully activated. For example, certain polymers containing pendant cyclohexene groups (e.g., such as described by Ching et al. in WO 99/48963, assigned to Chevron) or related C5-C9 unsaturated cycloaliphatic groups may exhibit a comparatively low level of initial oxygen-scavenging upon product packaging (assuming a potentially costly aging step was not utilized prior to product packaging). For purposes of convenience, such oxygen-scavenging groups and/or materials will be collectively referred to herein as "slow" oxygen-scavenging materials.

The potential affects of a "slow" initial rate of scavenging are illustrated graphically in FIG. 1, which shows the concentration of oxygen (over time) present in a sealed PET beverage bottle having a monolayer sidewall containing about 1 weight percent (wt-%) MXD6 nylon and about 12 ppm cobalt neodecanoate. The MXD6 nylon present in the bottle was not purposefully activated prior to product filling. At day 0, the bottle was filled with aqueous product and sealed. As depicted in FIG. 1, the sealed bottle contained an initial amount of entrapped oxygen, which is typical for sealed packaging articles due to the presence of oxygen dissolved within the packaged product and/or present in any headspace gas. As seen in FIG. 1, the amount of entrapped oxygen initially increased between days 0 and 160. This increase is believed to be due to the initial scavenging rate of the MXD6 nylon being less than the rate of oxygen ingress. While not intending to be bound by a theory, in addition to scavenger content, the scavenging "lag" illustrated in FIG. 1 may be dependent on the specifics of package design such as layer thickness, surface to volume ratio, and headspace volume and composition. For a given package design, the content of MXD6 nylon and cobalt catalyst in the barrier layer may be substantially increased to a level at which little, or no, measurable lag is present; however, such packaging articles may suffer from a variety of drawbacks including, for example, increased cost and/or increased haze or layer separation.

Materials and/or packaging articles with oxygen-scavenging profiles such as that of FIG. 1 may not be ideal for certain applications. For example, for products that are especially sensitive to oxygen-mediated degradation, it may desirable to pack the products in a packaging article having a suitably high amount of initial scavenging to rapidly scavenge any oxygen present in the product and/or headspace and thereby avoid degradation of the product via entrapped oxygen.

The use of an OS composition with a single type of OS group may also have one or more drawbacks. For example, such a material may have a robust initial ability to scavenge oxygen upon product packaging, but may not have the capacity and/or shelf-life to provide suitable levels of oxygen-scavenging over extended periods of time (e.g., months, years, etc.). This may result in degradation, via oxygen ingress, of packaged products having long commercial shelf-lives.

Rather than employing a single type of OS group, we have found that certain end use applications may benefit from a "hybrid" approach that uses two or more OS groups having different oxygen-scavenging properties and, more preferably, different oxygen-scavenging kinetics. The two or more different OS groups may be included in (i) a single polymer, (ii) separate polymers, or (iii) a mixture thereof. Alternatively, one or more of the OS groups may be included in one or more non-polymer OS components (e.g., monomers or oligomers including one or more OS groups). By selecting particular types and quantities of OS groups, an article may be produced that exhibits an oxygen-scavenging property (e.g., an oxygen-scavenging profile) that may not otherwise be achievable through use of a single type of OS group. For example, to achieve unique oxygen-scavenging profiles, preferred OS compositions of the invention include at least a first and a second OS group that preferably differ in one or more of the following properties: the mechanism for initiating oxygen-scavenging; scavenging kinetics; the induction period (i.e., the delay, if any, between packaging of an oxygen-sensitive product and the onset of appreciable oxygen-scavenging); the rate of oxygen-scavenging; and the time period for which the OS groups remains active and capable of scavenging oxygen (i.e., days, weeks, months, years, etc.).

In some embodiments of the invention, an OS composition is provided that exhibits both (i) robust initial oxygen scavenging (e.g., upon packaging of product) attributable, at least in part, to a first OS group and (ii) long-lasting oxygen scavenging (e.g., weeks, months, or years) attributable, at least in part, to a second OS group. By including a first OS group having a robust initial oxygen-scavenging response, the initial entrapped oxygen can be scavenged prior to the occurrence of any appreciable degradation of the packaged product.

We have discovered that unsaturated bicyclic OS groups can provide a robust initial oxygen-scavenging response. Moreover, we have discovered that the inclusion of a suitable amount of bicyclic OS groups in an OS composition containing a "slow" oxygen-scavenging material such as, for example, MXD6 nylon can prevent the persistence and/or accumulation of entrapped oxygen within a sealed packaging article during the time period following product packaging. Thus, in presently preferred embodiments, the OS composition of the invention includes an oxygen-scavenging component ("OS component") including: (i) a first OS group in the form of an unsaturated bicyclic group preferably having one or more double bonds in a ring of the bicyclic group and (ii) a second OS group having one or more oxygen-scavenging properties different from that of the bicyclic group. In presently preferred embodiments, the second OS group is (a) a polyamide OS group and/or (b) an acyclic or cyclic OS group having a carbon-carbon double bond. More preferably, the second OS group is a polyamide group such as a benzylic amide or benzylic polyamide group. The term "polyamide group" as used herein is intended to encompass both amide groups and polyamide OS groups.

The OS component may constitute a single polymer or a mixture of different polymers. For example, the OS component may include a polymer having both one or more bicyclic OS groups and one or more polyamide or other OS groups. Alternatively, the OS component may be a mixture of an OS polymer having one or more bicyclic OS groups and one or more additional OS polymers having one or more polyamide or other OS groups.

Polymers of the OS component can be of any suitable structure, including thermoplastic polymers, non-thermoplastic polymers (e.g., thermosetting), or a mixture of both. Similarly, polymers of the OS component can be addition polymers, condensation polymers, polymers that include both condensation and addition linkages or segments, or mixtures thereof. The configuration of the polymer backbone may vary depending upon a variety of considerations, including, for example, the desired properties of a composition incorporating the OS component, the expected use of the OS component, other materials that the OS component will contact or be intermixed with, or the type of OS component desired.

Non-limiting examples of suitable backbone structures for polymers of the OS component include polyesters and copolyesters such as polyethylene terephthalate ("PET"), polybutylene terephthalate ("PBT"), polyethylene naphthalate ("PEN"), polybutylene naphthalate ("PBN") and any other suitable esters of acids and diols; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PI"), polyetherimide ("PEI") and polyamideimide ("PAI"); polyphthalamide; sulfones such as polysulfone ("PSul"); polyarylsulfone ("PAS") and poly ether sulfone ("PES"); polyaminoacids; polydimethylsiloxanes; polyolefins such as polyethylene ("PE"), polypropylene ("PP"), polybutylene ("PB"), and polybutadiene ("PBD"); styrenes such as polystyrene ("PS"), poly α-methyl styrene and styrene/acrylonitrile ("SAN"); vinyls such as polyvinyl chloride ("PVC") and polyvinylnaphthalene ("PVN"); mixtures thereof; and copolymers and derivatives thereof which preferably do not unsuitably interfere with oxygen scavenging. OS groups may be incorporated into the aforementioned polymers at any convenient stage, including, for example, during production of the polymer or as a post-modification. In certain preferred embodiments, the OS polymers are suitable for contacting food or beverage products.

In certain preferred embodiments, the OS component includes a first OS polymer having a condensation backbone and a plurality of bicyclic groups. Some examples of suitable condensation backbone include any of the condensation backbones discussed above (i.e., polyester, polyamide, polyurethane, polycarbonate, etc.). Polyester (including copolyesters) backbones are presently preferred condensation backbones, with PET being particularly preferred in certain embodiments.

For example, a polyester may be formed using one or more polyols and one or more diacids.

Suitable diacids include dicarboxylic acid components such as, but not limited to, adipic acid, terephthalic acid, isophthalic acid, naphthalic acid, 2,6-naphthalene dicarboxylic acid, other naphthalene dicarboxylic acid isomers, mixtures of dicarboxylic acid components, and derivatives thereof. The dicarboxylic acid components may be present as derivatives, such as, for example, bis-hydroxyethyl terephthalate. Similarly, other suitable components may be selected and used in forming other types of polymers such as polyamide, polyepoxy, and polyurethane polymers.

Suitable polyols include, but are not limited to, aliphatic alcohols, cycloaliphatic alcohols, difunctional alcohols ("diols"), trifunctional alcohols ("triols"), tetrahydric or higher alcohols, and combinations thereof. Examples of some suitable polyols include ethylene glycol, propylene glycol, butylene glycol, neopentyl glycol, cyclohexane diol, cyclohexane dimethanol, hexane diol, glycerine, trimethylol propane ("TMP"), di trimethylolpropane, pentaerythritol, dipentaerythritol, trimethylol ethane, trimethylol butane substituted propane diols and triols (e.g., 2-methyl, 1,3-propane diol), substituted butane diols and triols, substituted pentane diols and triols, substituted hexane diols and triols, diethylene glycol and triols, derivatives thereof, and mixtures thereof.

Polymers of the OS component can be of any suitable size. The OS component preferably includes one or more OS polymers having a number average molecular weight ($M_n$) of at least about 1,000, more preferably at least about 1,500, and even more preferably at least about 2,000. Preferably, the one or more OS polymers have a $M_n$ of less than about 100,000, more preferably less than about 50,000, and even more preferably less than about 35,000. In one embodiment, the OS polymer containing the bicyclic group has a $M_n$ from about 2,000 to about 3,000.

If desired, the OS component may include one or more branched or highly-branched OS polymers (e.g., hyperbranched and/or dendridic polymers). For further discussion of highly branched oxygen scavenging polymer materials, see International App. No. PCT/US08/73839 by Joslin et al.

While not presently preferred, it is contemplated that the OS component may include one or more non-polymer OS materials such as, for example, an oligomer, a polymer precursor, and/or a low-molecular-weight compound. In such embodiments, the non-polymer OS materials may exhibit a number average molecular weight outside the aforementioned $M_n$'s. For example, the OS component may include an OS material having a $M_n$ of less than about 1,000. Some examples of non-polymer OS materials include Diels-Alder reaction products of a conjugated diene component (e.g., cyclopentadiene) and an unsaturated oil (e.g., linseed oil) such as the DILULIN product commercially available from Cargill, succinic anhydride derivatives including one or more OS groups described herein (e.g., the material of Formula III described below), and fatty-acid derivatives including one or more OS groups described herein (e.g., a Diels-Alder reaction product of an unsaturated fatty acid and cyclopentadiene).

As previously discussed, bicyclic OS groups of the invention preferably include at least one double bond, and more preferably at least one double bond located between atoms of a ring included in the bicyclic group. Examples of suitable double bonds include carbon-carbon ("C=C"), carbon-oxygen ("C=O"), carbon-nitrogen ("C=N"), nitrogen-nitrogen ("N=N"), and nitrogen-oxygen (N=O) double bonds, with C=C being preferred.

While not intending to be bound by theory, it is believed that such bicyclic OS groups may possess one or more of the following benefits: enhanced reactivity with oxygen, enhanced compatibilization of a polymer containing the bicyclic OS group with other materials, and/or reduced production of mobile oxidative cleavage fragments. While not intending to be bound by theory, the carbon-carbon double bonds present in unsaturated bicyclic groups such as norbornene are believed to exhibit enhanced oxygen-scavenging kinetics relative to carbon-carbon double bonds present in conventional acyclic oxygen-scavenging groups. The high level of ring strain typically present in unsaturated bicyclic groups is believed to contribute to the enhanced oxygen-scavenging kinetics. For further discussion of the reactivity of bicyclic compounds, see, for example, D. E. Van Sickel, F. R. Mayo, R. M. Arluck JACS (32) 1967, 3680 "Bridging of the cyclohexane ring has thoroughly deactivated the allylic bridgehead hydrogen atoms and increased the reactivity of the double bond by 8 to ninefold." By way of example, as discussed in International App. No. PCT/US08/59562 by Share et al., an unsaturated monomer functionalized with cyclopentadiene via a Diels-Alder reaction exhibited excellent oxygen scavenging performance when tested using a vial test oxygen scavenging methodology, whereas the unmodified unsaturated monomer did not.

In preferred embodiments, the bicyclic OS group includes a bicyclic structure represented by the IUPAC (International Union of Pure and Applied Chemistry) nomenclature Expression (I):

bicyclo[x.y.z]alkene

In Expression (I), x is an integer having a value of 2 or more, y and z are each an integer having a value of 1 or more, and the term alkene refers to the IUPAC nomenclature designation (e.g., hexene, heptene, heptadiene, octene, etc.) for a given bicyclic molecule.

In preferred embodiments, x has a value of 2 or 3 (more preferably 2) and each of y and z independently have a value of 1 or 2.

Examples of some suitable bicyclic OS groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred OS group.

It is contemplated that the bicyclic OS groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic OS group) or acyclic groups may be attached to the bicyclic group represent by Expression (I).

The OS component can contain any suitable number of bicyclic OS groups. While not intending to be bound by any theory, it is believed that the oxygen-scavenging ability of the bicyclic OS group is based on the presence of at least one double bond. Thus, it is believed that the number of bicyclic OS groups present in the OS component is an important factor in determining its oxygen-scavenging capacity. A sufficient number of bicyclic OS groups are preferably included to provide suitable oxygen-scavenging properties. The number of bicyclic OS groups included in the OS polymer and/or component may vary depending on a variety of considerations, including, for example, the intended application (e.g., the level of oxygen-scavenging capacity and/or rate desired, including, for example, the level of "initial" oxygen scavenging upon product packaging, the thickness of an article or layer in which the OS component is to be employed, the desired concentration of OS component in an article or composition, etc.) and the amount and efficacy of other types of oxygen-scavenging groups present in the OS component.

The bicyclic OS groups can be located at any suitable location of a polymer, including, for example, in a backbone, a pendant group, or at both backbone and pendant locations.

As discussed above, the OS component preferably further includes a second OS group in addition to the bicyclic OS group, which in preferred embodiments is:

(a) a polyamide OS group;

(b) an unsaturated group (e.g., a non-bicyclic unsaturated group), preferably including one or more carbon-carbon double bonds, and more preferably one or more carbon-carbon double bonds having a heat of hydrogenation of about 32 kcal/mole of less (e.g., from about 23 to about 32 kcal/mole, more preferably from 23 to 27.5 (e.g., cyclohexene groups); or (c) a mixture thereof.

In one embodiment, the second OS polymer does not include polybutadiene or butadiene segments.

Polyamide OS groups are preferred second OS groups in certain embodiments. Examples of suitable polyamide OS groups include m-xylylene adipamide; hexamethylene isophthalamide; hexamethylene adipamide-co-isophthalamide; hexamethylene adipamide-co-terephthalamide; hexamethylene isophthalamide-co-terephthalamide; or mixtures of two or more of these. Preferred polyamide groups include those containing groups of the following formula (A): -arylene-C(HR$^1$)—N(R$^2$)—(C=O)—, conveniently in —N(R$^3$)—C(HR$^4$)— arylene-C(HR$^1$)—N(R$^2$)—(C=O)—R$^5$—(C=O)— units, where:

$R^1$, $R^2$, $R^3$, and $R^4$ preferably each denote one of a hydrogen atom, a substituted or unsubstituted alkyl group, a substituted or unsubstituted cycloalkyl group, a substituted or unsubstituted aryl group, or a substituted or unsubstituted alkenyl group.

$R^5$ preferably denotes a divalent organic linking group including, for example, a substituted or unsubstituted alkyl group, a substituted or unsubstituted cycloalkyl group, a substituted or unsubstituted aryl group, or a substituted or unsubstituted alkenyl or cycloakenyl group. Typically $R^5$ will have from 1 to 10 carbons and be straight-chain or branched. In some embodiments, $R^5$ denotes a —(CH$_2$)$_n$— group where n is preferably from 1 to 10, and more preferably from 4 to 6.

If desired, the arylene group in the above formula (A) may be further substituted such as, for example, alkyl-substituted and/or condensed with other unsubstituted or alkyl-substituted aromatic rings.

Substituted or unsubstituted phenylene groups such as, for example, substituted or unsubstituted 1,2- or 1,3-phenylene groups are preferred arylene groups.

In a presently preferred embodiment, the polyamide OS group is a reaction product of m-xylylenediamine and a polycarboxylic acid such as adipic acid. Poly(m-xylylene adipamide), otherwise known commercially as MXD6 nylon, is an example of a suitable polymer including such a polyamide OS group. It is contemplated that the polyamide OS group may be included in any suitable polymer, including any of the polymers described herein.

Examples of suitable unsaturated OS groups may include cyclopentene, cyclohexene, cycloheptene, cyclooctene (including, e.g., cis-cyclooctene), and mixtures thereof.

In a presently preferred embodiment, the OS component contains a mixture of: (i) a first OS polymer, preferably having a condensation backbone, that preferably includes a plurality of backbone, terminal, and/or pendant bicyclic OS groups and (ii) a polyamide OS polymer, more preferably a polyamide polymer containing a polyamide group of formula (A) such as, for example, MXD6 nylon. The ratio of the aforementioned first OS polymer to the polyamide OS polymer may be dictated by a variety of factors including, for example, cost, compatibility, the end use application, the desired oxygen-scavenging profile, and the "concentration" of oxygen-scavenging groups present in the first OS polymer and/or the polyamide OS polymer. In certain embodiments, a packaging article may contain from about 0.1 to about 99.9 wt-% of the first OS polymer and about 0.1 to about 99.9 wt-% of the polyamide OS polymer, about 0.25 to about 2 wt-% of the first OS polymer and about 0.5 to about 5 wt-% of the polyamide OS polymer, or about 0.5 to about 1.0 wt-% of the first OS polymer and about 1 to about 2 wt-% of the polyamide OS polymer, based on the total weight of the packaging article. The concentrations of the first OS polymer and the polyamide OS polymer will typically be higher in the barrier layer(s) of multilayer articles than the barrier layer of monolayer articles. In some embodiments, the polyamide OS polymer of the aforementioned weight ranges is all, or substantially all, MXD6 nylon or the like.

In presently preferred embodiments, the bicyclic OS group is formed using a conjugated diene component that is preferably capable of participating in a Diels-Alder reaction with an unsaturated component (often referred to as a "dieneophile" in the context of a Diels-Alder reaction). Diels-Alder reactions (often referred to as [4+2] cycloadditions) typically involve the addition of an unsaturated component across the 1,4 positions of a conjugated diene component to form a cycloaddition reaction product that is typically cyclic or bicyclic in nature. Typically, at least one of the conjugated diene and unsaturated components contains one or more substituents that "activate" the component toward reaction, although in some instances one or both components can contain a "deactivating" substituent or substituents. The Diels-Alder reaction is generally considered to be a concerted reaction, and as such, either component can be the "electron donor" or "electron acceptor" depending upon the substituents bonded thereto.

The conjugated diene component used in the method of the invention can be any suitable type of compound that contains any suitable type and combination of conjugated double bonds. Examples of suitable double bonds include C=C, C=O, C=N, N=N, and N=O double bonds, with C=C being preferred. The conjugated double bonds can be present in an acyclic group (e.g., butadiene), a cyclic group (including, e.g., cyclic, bicyclic, and fused rings), or a combination of both. In some embodiments, the conjugated diene component is present in a polymer or polymer precursor. In some embodiments, the conjugated diene component includes an aromatic group preferably capable of participating in a Diels-Alder reaction. Examples of conjugated dienes capable of participating in Diels-Alder reactions include anthracene, butadiene (including, e.g., dimethyl butadiene), cyclohexadiene, cyclopentadiene (including, e.g., 1-alkyl cyclopentadienes or 2-alkyl cyclopentadienes), furan, isoprene, methyl vinyl ketone, thiophene, polymers and polymer precursors containing any of these, derivatives thereof, and combinations thereof.

Presently preferred conjugated diene components include at least one ring preferably having about 5 to about 8 atoms in the ring, and more preferably 5 or 6 atoms in the ring. In a particularly preferred embodiment, the conjugated diene component includes at least one 5-member ring, with cyclopentadiene being a presently preferred 5-member ring.

In a preferred embodiment, cyclopentadiene is reacted with a C=C of an unsaturated component to yield a norbornene group.

Suitable unsaturated components of the invention include any components capable of participating in a Diels-Alder reaction to form a bicyclic OS group. The unsaturated component can be any suitable type of compound that contains one or more double or triple bonds. Examples of suitable double and triple bonds include C=C, C=O, C=N, N=N, N=O, carbon-carbon triple bonds ("C≡C"), and carbon-nitrogen triple bonds ("C≡N"), with C=C bonds being presently preferred. In some embodiments, the unsaturated component is present in a polymer or polymer precursor.

As previously mentioned, the conjugated diene component and/or the unsaturated component may contain any suitable electron-donating group, electron-withdrawing group, or a combination of both. Diels-Alder reactions can typically be accelerated using groups that activate the reactant pair by making one of the conjugated diene or unsaturated components more electron-deficient and the other more electron-rich (e.g., by using an electron-withdrawing group on one reactant and an electron-donating group on the other). The electron-withdrawing or electron-donating effect of a given group on the conjugated diene or unsaturated components is typically exerted by a group located within one atom (i.e., alpha) of the reactive double or triple bond. That is, the electron-donating or electron-withdrawing group typically does not include an atom of the double or triple bond, but rather is bonded directly to an atom of the double or triple bond. Examples of electron-withdrawing groups include carbonyl (e.g., of an aldehyde, ketone, acid, ester, or amide group), nitrile, nitro, halo, substituted or unsubstituted aryl, hydroxy-methyl, amino- or substituted-aminomethyl, cyanomethyl, halomethyl and vinyl groups. Examples of electron-donating groups include straight chain, branched chain, and cyclic alkyl, amino, substituted amino, hydroxyl, and ether groups. In certain embodiments of the invention, one of the conjugated diene or unsaturated components contains one or more electron-donating group whereas the other contains one or more electron-withdrawing group.

In one embodiment, an unsaturated polyolefin such as a polybutadiene polymer (or a polymer containing butadiene or polybutadiene segments) may be functionalized with bicyclic OS groups via a Diels-Alder reaction to yield an OS polymer useful in compositions of the invention.

OS polymers of the invention may be formed using a wide array of processes including, for example, reactor polymerization and reactive extrusion. In reactive extrusion, the components may be fed into the mixing zone of the extruder. The components may be mixed together before feeding into the extruder, or may be fed separately. Preferably, the components will be fed separately. As part of the extrusion process, the components will be subjected to elevated temperature, pressure, and shear as the components travel through the extruder. This process mixes the components, and also causes the components to react, forming the polymer composition.

The one or more bicyclic OS groups can be incorporated into an OS polymer using any suitable reaction method, including, for example, (i) forming an OS polymer from a polymer precursor (e.g., a monomer or oligomer) containing a preformed bicyclic OS group, (ii) providing a preformed polymer and then modifying the polymer to contain the bicyclic OS group, or (iii) combining the reactants for forming the cyclic OS group with reactants (e.g., monomers and/or oligomers) for forming the polymer and reacting the combined reactants to form an OS polymer containing one or more bicyclic OS groups.

An example of a method for forming the bicyclic OS group includes reacting a conjugated diene component with an unsaturated component to produce a polymer precursor (e.g., a monomer or oligomer) containing at least one bicyclic OS group. For example, an addition or condensation monomer containing one of the conjugated diene component or unsaturated component can be reacted with the other of the conjugated diene component or unsaturated component to form a monomer including a bicyclic OS group, whereby the monomer is capable of being polymerized into a polymer. Examples of suitable polymer precursors include unsaturated mono- or poly-acids (or anhydrides or esters thereof), alcohols, amines, isocyanates, thiols, vinyls, and combinations thereof. In certain embodiments, the unsaturated component is a polymer precursor in the form of an unsaturated fatty acid or unsaturated succinic anhydride derivative.

In some embodiments, polymer precursors containing at least one bicyclic OS group are incorporated into a polymer such that at least one condensation linkage group attaches the polymer precursor to another portion of the polymer. For example, in one such embodiment, the polymer precursor may be incorporated into a backbone of an OS polymer such that a pair of condensation linkage groups attach the polymer precursor to the backbone.

In another embodiment of the method of the invention, a preformed polymer that includes at least one of the unsaturated or conjugated diene components is provided. For example, a polymer having one or more double or triple bonds (i.e., the unsaturated component) capable of participating in a Diels-Alder reaction can be reacted with a conjugated diene component to form an OS polymer including one or more bicyclic OS groups, whereby the bicyclic OS group is located at the former site of the unsaturated component that participated in the reaction. By way of example, an unsaturated polyester can be reacted with cyclopentadiene to yield a polyester having one or more norbornene groups.

In some embodiments, a cyclopentadiene component is reacted with an unsaturated component, preferably in the form of a substituted or unsubstituted alkene, to form a monomer containing an unsaturated bicyclic structure. Examples of suitable substituted or unsubstituted alkenes include monounsaturated or polyunsaturated acids, alcohols, amines, isocyanates, thiols, vinyls, or combinations thereof. Monounsaturated or polyunsaturated fatty acids and succinic anhydride derivatives are presently preferred.

Suitable unsaturated succinic anhydride derivatives include, for example, reaction products of maleic anhydride and a substituted alkene. Suitable substituents for the alkene include, for example, saturated or unsaturated hydrocarbon chains that may be (i) linear or branched, and substituted or unsubstituted, as well as (ii) substituted or unsubstituted phenyl groups. Some of the substituents on the alkenyl group may be bound together as part of a ring structure. Preferred succinic anhydride derivatives include octenyl succinic anhydride (OSA), nonenyl succinic anhydride (NSA), heptenyl succinic anhydride (HSA), and the like. OSA, shown below in Formula (II), is particularly preferred.

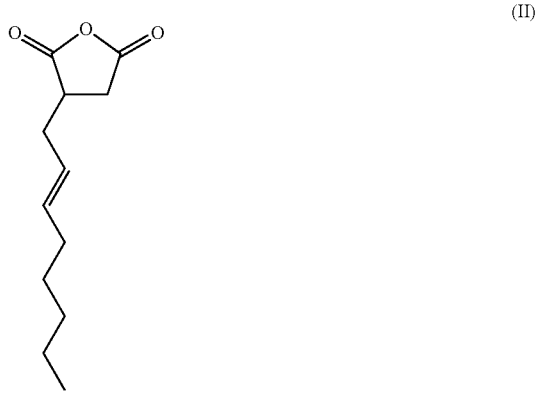

(II)

The benefits of using an unsaturated succinic anhydride derivative may include: ease of processing, general availability at low cost, ability to co-polymerize, compatibility with many polymers and monomers for reaction, stability during storage, and low toxicity. Unsaturated succinic anhydride derivatives may be reacted with a wide variety of materials, depending upon the type of polymer backbone desired. For example, a succinic anhydride derivative can be reacted with an alcohol or glycol to form a polyester. As another example, a succinic anhydride derivative may be reacted with an amine to form a polyamide.

For further information regarding unsaturated succinic anhydride derivatives and their use in forming polymers, see US Pub. No. 2006/0202161 by Share et al., which is incorporated herein by reference in its entirety.

While not wishing to be bound to any theory, Formula (III) below shows a preferred Diels-Alder reaction product that is believed to result from reacting OSA with cyclopentadiene.

The structure of Formula (III) is non-limiting with respect to stereochemistry and is intended to encompass all possible stereoisomers. As shown in Formula (III), the reaction product of OSA and cyclopentadiene is believed to include a norbornene bicyclic group.

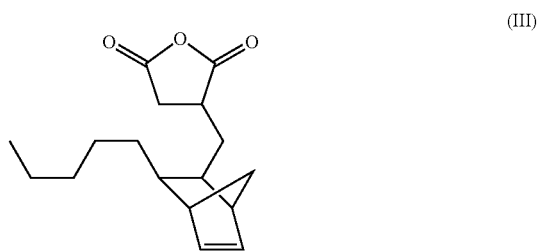

(III)

In some embodiments, unsaturated fatty acids are reacted with a conjugated diene component to form fatty acids containing one or more unsaturated bicyclic OS groups. Examples of suitable fatty acids include mono- or polyunsaturated fatty acids such as arichidonic, eleostearic, erucic, licanic, linoleic, linolenic, oleic, palmitoleic, ricinoleic acid, and mixtures thereof. Other useful fatty acids may include mixtures of saturated and unsaturated fatty acids such as, for example, fatty acids from natural or modified oils such as linseed oil, soybean oil, sunflower oil, safflower oil, castor oil, and mixtures thereof. In a presently preferred embodiment, linoleic acid is reacted with cyclopentadiene in a Diels-Alder reaction to form a reaction product having at least one bicyclic OS group (which is believed to be a norbornene group).

Any suitable Diels-Alder reaction techniques or conditions can be employed to produce bicyclic OS groups of the invention. By way of example, a Diels-Alder reaction using cyclopentadiene to produce a bicyclic OS group can be carried out in a number of ways, including, for example, (i) combining dicyclopentadiene and an unsaturated component in a reaction vessel or (ii) separately cracking dicyclopentadiene to generate cyclopentadiene and then combining the cyclopentadiene and an unsaturated component in a reaction vessel.

By way of example, a suitable reaction product of dicyclopentadiene and an unsaturated component may be made using a Diels-Alder reaction process as follows: An unsaturated component is charged into a closed reactor purged with an inert gas such as nitrogen. The unsaturated component is heated to about 260° C. with constant stirring and dicyclopentadiene is added at a steady rate to the heated unsaturated component. While not intending to be bound by any theory, it is believed that the dicyclopentadiene dedimerizes into two molecules of cyclopentadiene in the reactor vessel, which then react with the double bonds of the unsaturated component. After the addition of the dicyclopentadiene is complete, heating of the reaction mixture is continued at a temperature of preferably not more than about 300° C., and even more preferably not more than about 275° C., for about 0.25 hour to about 5 hours. The reaction is generally permitted to proceed until substantially all of the cyclopentadiene has reacted with the unsaturated component. Thereafter, the reaction product is cooled and removed from the reaction vessel. For further discussion of Diels-Alder reaction conditions suitable for use with dicyclopentadiene, see for example, U.S. Pub. No. 2003/0036486, U.S. Pat. Nos. 5,693,715, and 5,288,805, which are incorporated herein by reference in their entirety.

In another aspect, the invention provides an OS composition containing an OS component that includes (i) a "fast" OS group such as an unsaturated OS group, preferably an unsaturated cyclic OS group, having a relatively high heat of hydrogenation (e.g., above that of cyclohexene in certain embodiments) and (ii) a second OS group, preferably an OS group having a "long-lasting" (e.g., months, years, etc.) oxygen-scavenging effect such as, for example, polyamide OS groups such as that of formula (A) described above. While not intending to be bound by theory, it is believed that the desirable scavenging profile (e.g., the combination of initial and medium-term/long-term oxygen scavenging properties) of certain preferred OS compositions of the invention is attributable, at least in part, to the inclusion of an unsaturated OS groups having a relatively high heat of hydrogenation (such as, e.g., an unsaturated bicyclic group). As discussed in International App. No. PCT/US08/59562 by Share et al., heat of hydrogenation is believed to be a useful measure of the relative suitability of OS groups in which double bonds are responsible, at least in part, for the oxygen-scavenging propensity of a material including the group. While not intending to be bound by theory, it is believed that the heat of hydrogenation of a double bond of an unsaturated group corresponds to the propensity of the unsaturated group to scavenge oxygen, with a higher heat of hydrogenation indicating a greater propensity to scavenge oxygen. For further discussion of heats of hydrogenation see, for example, V.V. Voronenkov, Russian Chemical Reviews, 44 (4), 1975.

In some embodiments, the OS component includes an unsaturated cyclic OS group (which can be a bicyclic or a non-bicyclic cyclic OS group) having one or more rings, at least one of which is preferably an unsaturated ring having one or more double bonds (preferably carbon-carbon double bonds) located between atoms of the ring. The double bond preferably has a heat of hydrogenation greater than that of cyclohexene, more preferably at least about as high as that of bicyclo[2.2.2]octene, and even more preferably at least about as high as that of bicyclo[2.2.1]heptene. The upper end of the heat of hydrogenation is not particularly limited and can be any suitable heat of hydrogenation for a given application. In some embodiments, the double bond has a heat of hydrogenation of at least about 32 kcal/mole.

As used herein, when a heat of hydrogenation is stated to be, for example, "at least X," "greater than X," or the like, it should be understood that reference is made to the absolute value of the heat of hydrogenation because heats of hydrogenation are typically reported as negative values, with a larger negative value indicating a higher heat of hydrogenation (e.g., −40 kcal/mole is a higher heat of hydrogenation than −10 kcal/mole).

Examples of unsaturated cyclic OS groups having a heat of hydrogenation greater than that of cyclohexene include bicyclic groups such as bicyclo[2.2.1]heptene, bicyclo[2.2.2]octene, bicyclo[2.2.2]octadiene, bicyclo[2.2.1]heptadiene; and non-bicyclic groups such as methylenecyclobutane, ethylidenecyclopropane, and 1,2-dimethylcyclopropene. Table 1 below provides the heat of hydrogenation values for a variety of unsaturated molecules. The heat of hydrogenation values reported in Table 1 were obtained from the following published literature sources: R. B Turner, W. R. Meador, R. R. Winkler, J. Am. Chem. Soc., (79) p. 4116 (1957); R. B. Turner, A. D. Jarrett, P. Goebel, B. J. Mallon, J. Am. Chem. Soc, (95), p. 790 (1973); and R. B. Turner, W. R. Meador, J. Am. Chem. Soc., (79) p. 4133 (1957); and William H. Brown, Cristopher S. Foote, Brent L. Iverson, Organic Chemistry, p 784 (2005).

TABLE 1

| Molecule | Heat of Hydrogenation (kcal/mole*) |
|---|---|
| cis-Cyclooctene | −22.98 |
| Cycloheptene | −25.85 |
| Cyclopentene | −26.04 |
| Cyclohexene | −27.10 |
| trans-2-Butene | −27.62 |
| Bicyclo[2.2.2]octadiene** | −56.21 (−28.11) |
| Bicyclo[2.2.2]octene | −28.25 |
| cis-2-Butene | −28.57 |
| Methylenecyclobutane | −29.43 |
| 1-Butene | −30.3 |
| Bicyclo[2.2.1]heptene | −33.13 |
| Bicyclo[2.2.1]heptadiene** | −68.11 (−34.06) |
| Ethylidenecyclopropane | −37.01 |
| 1,2-Dimethylcyclopropene | −43.3 |

*Data is reported in kilocalories per mole of each molecule.
**For these molecules, the heat of hydrogenation value includes the heat of hydrogenation for two carbon-carbon double bonds present in each molecule. The heat of hydrogenation value for each carbon-carbon double bond will typically be approximately one-half that of the entire molecule, and is the value reported in parentheses. While not intending to be bound by any theory, factors such as resonance effects will lower the heat of hydrogenation for a conjugated polyene relative to the respective non-conjugated isomer.

As evidenced by the data in Table 1, bicyclic structures such as, for example, bicyclo[2.2.1]heptene and bicyclo[2.2.2]octene and non-bicyclic structures such as, for example, methylenecyclobutane and ethylidenecyclopropane exhibit a higher heat of hydrogenation than cyclohexene. It is believed that the heat of hydrogenation for molecules such as those listed in Table 1 is a strong indicator of the propensity of the molecule to scavenge oxygen when included as a covalently attached group in a polymer. Thus, for example, a polymer including an OS group having a heat of hydrogenation at least as great as that of bicyclo[2.2.1] heptene may exhibit robust initial oxygen-scavenging properties (e.g., when combined with a suitable amount of oxidation catalyst) in the absence of a costly aging period (which is required for certain conventional oxygen-scavenging materials).

The heat of hydrogenation for an OS group may be determined using the techniques described in the literature sources of Table 1. Typically, the heat of hydrogenation for a molecule is substantially the same as the heat of hydrogenation value for the molecule when present as a group of a polymer, although it is possible that other moieties present on a polymer may interfere with the determination of the heat of hydrogenation value for the group of interest. Thus, one useful approach for determining the heat of hydrogenation value for an oxygen-scavenging group of a polymer is to determine (either experimentally using known methods or by consulting reported literature values) the heat of hydrogenation value for a molecule having the structure of the oxygen-scavenging group. If more than one double bond is present in the oxygen-scavenging group, appropriate steps should preferably be taken to normalize the heat of hydrogenation per double bond present.

OS compositions of the invention preferably include the OS component described herein and one or more optional oxidation catalysts. In some embodiments, the OS composition further includes one or more optional additional polymers or additives.

An optional oxidation catalyst is preferably included in OS compositions of the invention. In some embodiments, the oxidation catalyst may enhance the oxygen-scavenging properties of the OS component by catalyzing an oxygen-scavenging reaction involving OS groups of the OS component.

A broad variety of metallic and organic compounds can catalyze the oxygen scavenging effect of certain OS groups, and an appropriate compound may be selected based on any of cost, compatibility with the OS component, compatibility with other polymers or ingredients in a blend, and compatibility with other layers in a multi-layered article. Examples of suitable oxidation catalysts include transition metals, complexes of transition metals, photoinitiators and the like, and mixtures thereof.

Examples of suitable oxidation catalysts include transition metals such as cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred catalysts include salts of cobalt and long chain acids such as, for example, cobalt acetate, cobalt neodecanoate, cobalt stearate, cobalt octoate, and mixtures thereof.

When included, the oxidation catalyst is preferably present in an amount sufficient to catalyze the oxygen-scavenging ability of the OS component in the end use application. The amount used will depend partially upon the catalyst chosen. In general, however, when using transition metal catalysts or complexes, the amount of transition metal catalyst or complex present in the end use application (e.g., in a monolayer article or in a layer of a multilayer article) may suitably be greater than about 10 ppm by weight, preferably greater than about 25 ppm by weight, and more preferably greater than about 35 ppm by weight, based on the total amount of transitional metal in the catalyst or complex relative to the total weight of the composition. The amount of transition metal catalyst or complex present in the end use application may suitably be less than about 10,000 ppm by weight, preferably less than about 1,000 ppm by weight, and more preferably less than about 600 ppm by weight, based on the total amount of transitional metal in the catalyst or complex relative to the total weight of the composition. In general, when using a photoinitiator or blend of photoinitiators, the amount of photoinitiator present may suitably be greater than about 0.01% by weight, and preferably greater than about 0.1% by weight of the total composition. The amount of photoinitiator present may suitably be less than about 10% by weight, and preferably less than about 5% by weight of the total composition.

The amount of oxidation catalyst present in the OS composition of the invention may vary widely depending upon, for example, the amount of OS composition to be included in an article. For example, if a monolayer article or layer(s) of a multilayer article is to be formed from neat OS composition (i.e., 100 wt-% OS composition), and a transition metal catalyst or complex is to be used, then the amount of transition metal catalyst or complex present in the OS composition is preferably as described above for a desired end use application. If, however, the OS composition is to be diluted with additional material in forming the monolayer article or layer(s), then the OS composition preferably includes a higher concentration of catalyst to account for dilution. Thus, for example, in an embodiment where an OS composition is to be diluted twenty-fold in an end use, the OS composition preferably has a catalyst concentration that is about twenty times higher than the catalyst concentration desired in the end use. Moreover, depending upon the approach employed in such embodiments, portions of the OS composition may have even higher concentrations of catalyst than that of the overall blend. For example, in some embodiments where the OS composition is a blend of two or more different types of particles, all or substantially all of the catalyst may be introduced into the blend through incorporation of a catalyst concentrate particle into the blend.

Compositions of the invention will typically include one or more optional polymers in addition to any polymers of the OS component. These additional polymers can be thermoplastic, non-thermoplastic (e.g., thermosetting), or a mixture of both. Examples of such suitable polymers include any of the polymer types described above in regards to the OS component. In certain embodiments, the one or more additional polymers are preferably formable polymers useful in forming a packaging article and are preferably suitable for contacting food or beverage products. The one or more additional polymers also preferably exhibit a suitable level of compatibility with the materials of the OS component.

In some embodiments, the OS composition comprises a blend of the OS component and one or more additional polymers (e.g. base and/or structural polymers), wherein the OS composition comprises from about 99 to about 1 wt-% of the OS component and from about 1 to about 99 wt-% of the one or more additional polymers, from about 95 to about 5 wt-% of the OS component and from about 5 to about 95 wt-% of one or more additional polymers, from about 90 to about 10 wt-% of the OS component and from about 10 to about 90 wt-% of one or more additional polymers, or from about 80 to about 20 wt-% of the OS component and from about 20 to about 80 wt-% of the one or more additional polymer. In a presently preferred embodiment, the one or more additional polymers are polyesters, and more preferably PET.

In general, any suitable material can be added to the OS compositions of the invention that produces a desired result. For example, fillers, processing aids, plasticizers, fire retardants, anti-fog agents, crystallization aids, impact modifiers, surface lubricants, denesting agents, stabilizers, antioxidants, ultraviolet light absorbing agents, catalyst deactivators, colorants, nucleating agents, acetaldehyde reducing compounds, reheat enhancing aids, fillers, anti-abrasion additives, and the like, and combinations thereof can be included. In one embodiment, the OS composition includes the OS component described, an oxidation catalyst, an additional polymer (e.g., a structural base polymer) and a colorant.

Another aspect of the invention is an article incorporating OS compositions of the invention. OS compositions of the invention are particularly useful in oxygen-scavenging layers (also referred to as "oxygen barrier layers") of packaging articles. Packaging articles incorporating the OS composition of the invention can be used to package any product for which it is desirable to inhibit exposure to oxygen during storage. Examples of such products include certain food or beverage products (e.g., fruit juices, wine, beer, meat, etc.), pharmaceuticals, medical products, corrodible metals, and electronic devices.

Examples of packaging articles include bottles (including bottle crowns, caps, and other closures), cups, bowls, cartons (including, e.g., paperboard or fiberboard cartons), containers, films, wraps (including, e.g., meat wraps), liners (e.g., crown, cap, or closure liners), coatings, trays, and flexible bags for industrial, commercial, medical, or residential use. The packaging articles may be rigid or flexible based on, for example, the number and type(s) of layers, the method of formation of the packaging article, and other relevant parameters. The articles may be formed by using the OS composition alone, by using a blend of the OS composition with one or more other polymers, or by using a multi-layer construction incorporating one or more layers including the OS composition.

Additionally, the OS composition may be used as a coating, as a lining, or as part of a blend for a coating or lining of another article, such as a can, bottle, or container coating or lining. In some embodiments, the OS composition may be applied (either directly or via one or more intermediate layers) to a substrate such as a metal, plastic, fiberboard, or paperboard substrate.

If desired, the OS composition (which, in some embodiments, is the OS component alone and/or in combination with an oxidation catalyst) may be dissolved in a suitable solvent to form a coating solution or may be blended with water and/or a suitable organic solvent to form a coating dispersion. The coating solution or dispersion may be applied using any suitable method, including, for example, spraying the coating solution or dispersion onto a surface of an article and drying the coating to form an oxygen-scavenging coating. If desired, the coating solution or dispersion may be applied between layers of another suitable material to form an oxygen-scavenging film.

Alternatively, the OS composition may be blended with a compatible polymer to form an oxygen-scavenging article, or may be used as an oxygen-scavenging layer in a multi-layered package construction.

Packaging articles incorporating OS compositions of the invention can be of any desired construction. The packaging articles can be formed from multiple layers of material (referred to as "multilayer" articles) or a single layer of material (referred to as "monolayer" articles). The packaging articles can include a single structural layer or a structural layer and one or more additional layers. The one or more additional layers can be, for example, a gas barrier layer (e.g., a layer incorporating a passive barrier material such as an ethylene-vinyl alcohol copolymer ("EVOH")), an oxygen-scavenging layer, a food-contact layer, a structural layer, an adhesive layer, or any layer that combines one or more of these, alone or in any combination. Multilayer packaging articles are typically prepared using coextrusion, injection molding, injection blow molding, stretch blow molding, coating, or lamination, among other techniques. Monolayer packaging articles are typically prepared by solvent casting, injection molding, blow molding, or by extrusion, among other techniques. A monolayer article is an article formed of substantially the same composition throughout.

A multilayer article may be produced that includes the OS composition in one or more layers. In some embodiments, a multilayer article may benefit from (i) placing one or more layers of another material between the atmosphere and the OS composition and/or (ii) placing one or more layers of another material between a packaged product and the OS composition. An outer layer of one or more layers may, for example, protect the OS composition from physical damage and assist in blocking or reducing migration of oxygen through a wall of the article. In such constructions, the OS composition will preferably scavenge any oxygen that penetrates the one or more layers located between the atmosphere and the OS composition. In addition, the OS composition is also preferably capable of scavenging oxygen that may be present inside a packaged product or within a headspace of the packaging article (if present).

The OS composition of the invention may be deployed neat to form an oxygen-scavenging layer of a monolayer or multilayer packaging article. Or, alternatively, prior to formation of the oxygen-scavenging layer of the packaging article, it can be blended (e.g., in the feedthroat of an extruder prior to article formation) with one more additional polymers or additives, which may, for example, reduce transportation and storage costs and/or help preserve the oxygen-scavenging capacity of the OS composition.

Articles of the invention can include any suitable amount of OS component. The amount of OS component included in such articles may vary depending upon a variety of considerations such as, for example, the desired oxygen-scavenging properties of the article, the efficacy of the OS component, cost, and the desired article properties. In preferred embodiments, monolayer or multilayer articles of the invention preferably include at least about 0.1 wt-%, more preferably at least about 0.5 wt-%, and even more preferably at least about 1.0 wt-% of the OS component of the invention, based on the total weight of the monolayer or multilayer article. In general, a monolayer or multilayer article will typically include less than about 15 wt-%, more preferably less than about 10 wt-%, and even more preferably less than about 5 wt-% of the OS component of the invention, based on the total weight of the monolayer or multilayer article. Nonetheless, it is contemplated that the OS component may constitute, on a weight basis, all or substantially all of the material of the packaging article if desired. For example, in some embodiments, bicyclic OS groups of the invention may be present on a base polymer (e.g., a structural polymer) of the article.

In some embodiments, a monolayer article is provided that includes about 85 wt-% or more of one or more base polymers (e.g., a polyester such as PET, a polyolefin, etc.) and about 15 wt-% or less of OS component, more preferably about 90 wt-% or more of one or more base polymers and about 10 wt-% or less of OS component, and even more preferably about 95 wt-% or more of one or more base polymers and about 5 wt-% or less of OS component. In one such embodiment, the monolayer articles includes about 85 wt-% or more of one or more polyester base materials and about 15 wt-% or less of an OS component that includes a mixture of a polyamide OS polymer and an OS polymer having a bicyclic OS group of the invention.

Articles containing the OS composition of the invention are preferably storage stable for a prolonged period of time (e.g., at least days, weeks, or months) under normal atmospheric conditions (e.g., ambient temperature, ambient humidity, and/or atmospheric air) without exhibiting unsuitable degradation in oxygen-scavenging properties, thereby avoiding costly storage techniques (e.g., storage under nitrogen gas, refrigeration, dessication, etc.) frequently associated with certain oxygen-scavenging articles.

In some embodiments, to preserve oxygen-scavenging capacity, the OS component invention is combined with oxidation catalyst just prior to, or during, formation of an oxygen-scavenging layer of a packaging article. Such a timing of oxidation catalyst addition may result in enhanced storage stability for OS components and/or compositions of the invention prior to article formation.

In some embodiments, the OS composition of the invention may include two or more parts, in which one or more part includes the OS component and a different part includes the optional oxidation catalyst. In one such embodiment, the composition is a blend of two or more types of particles (preferably thermoplastic particles such as thermoplastic pellets, flakes, powder, etc.) where (a) a first particle includes a blend of the OS component and an optional first polymer, (b) a second particle includes a blend of an oxidation catalyst and an optional second polymer, and (c) the optional first and second polymers are the same or different. The first particle may include any suitable amount of transitional metal catalyst or complex, including, for example, from about 1,000 ppm to about 40,000 ppm, from 5,000 ppm to about 30,000 ppm, or from about 10,000 ppm to about 25,000 ppm, based on the total amount of transitional metal in the catalyst or complex present in the first particles relative to the total weight of the first particles. In some embodiments, the second particles may be free, or substantially free, of oxidation catalyst. The above first and second particles may be combined at any suitable time to form a blend. For example, the above first and second particles may be combined to form a blend that may be stored for a period of time (e.g., days, weeks, months, etc.) before forming an article that includes the blend. Alternatively, the above first and second particles may be combined to form a blend just prior to forming an article from the blend, such as, for example, in the feedthroat of an injection molding machine or extruder. Thus, in some embodiments, the OS composition may be provided as a two-part (or more) kit or system including the above first and second particles, where the above first and second particles are not (or substantially are not) in contact with other.

Monolayer and multilayer articles of the invention may be formed from compositions of the invention using any suitable method. Examples of suitable methods include extrusion processes (including, e.g., co-extrusion), lamination processes, injection processes (including, e.g., co-injection), application of liquid coating compositions to at least a portion of a substrate, or a combination thereof. One or more precursor or intermediate articles, such as for example a preform, may be formed in route to the finished article.

In certain embodiments, to facilitate incorporation of the oxygen-scavenging materials described herein into an article, solid thermoplastic particles (e.g., pellets, flakes, powder, etc.) are formed which include the OS component described herein. Such thermoplastic particles may be formed, for example, by melt blending the OS component with a thermoplastic polymer and/or an oxidation catalyst and pelletizing the resulting blend. In some embodiments, the thermoplastic particles may be formed from the OS polymer(s) alone.

EXAMPLES

The invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Examples 1-3

Preparation of Polymer Precursors

Example 1

A polymer precursor containing a bicyclic OS group in the form of a norbornene group was prepared as follows using 1.0 mole of trimethylol propane ("TMP") and 1.1 mole of cyclopentadiene-modified linseed oil fatty acid:

To a 4-neck round-bottom flask equipped with a mechanical stirrer, a packed column, Dean-Starke trap, condenser, and a thermocouple connected to a temperature control device, were added 405 parts of cyclopentadiene-modified linseed oil fatty acid (a Diels-Alder reaction product of cyclopentadiene and linseed oil fatty acids), 95 parts of TMP, and 0.5 parts of FASCAT 4201 (a dibutyltin oxide catalyst commercially available from Atofina). The mixture was heated to 210° C. over the course of about 70 minutes. After heating the mixture for an additional 4 hours, the mixture had an acid number of 0.8 and a hydroxyl number of 146. The mixture was then cooled and discharged from the flask.

Example 2

A polymer precursor containing a cyclic OS group in the form of a norbornene group was prepared as follows using 1.0 mole of pentaerythritol and 2.1 mole of cyclopentadiene-modified linseed oil fatty acid:

To a 4-neck round-bottom flask equipped with a mechanical stirrer, a packed column, Dean-Starke trap, condenser, and a thermocouple connected to a temperature control device, were added 1981.8 parts of dicyclopentadiene-modified linseed oil fatty acid (a Diels-Alder reaction product of dicyclopentadiene and linseed oil fatty acids), 274.4 parts pentaerythritol, and 2.2 parts FASCAT 4201. The mixture was heated to 210° C. over the course of about 3 hours. After heating the mixture for an additional 2 hours, the mixture had an acid number of 2 and a hydroxyl number of 90. The mixture was then cooled and discharged from the flask.

Example 3

A polymer precursor containing a cyclic OS group in the form of a norbornene group was prepared as follows using 2 moles of ethylene glycol and 1 mole of a Diels-Alder reaction product of cyclopentadiene and octenylsuccinic anhydride (referred hereinafter as "cyclopentadiene adduct of OSA"):

To a 4-neck round-bottom flask equipped with a mechanical stirrer, a packed column, Dean-Starke trap, condenser, and a thermocouple connected to a temperature control device, were added 372.5 parts of cyclopentadiene adduct of OSA, 127.5 parts of ethylene glycol, and 0.5 grams of FASCAT 4201. This mixture was heated to 220° C. over the course of about 2.5 hours. After 4 hours total at 220° C., the mixture had an acid number of 2.4 and a hydroxyl number of 179. The mixture was cooled and discharged at 150° C. from the flask.

Examples 4-8

Preparation of Polyester Os Polymers

Example 4

To a 4-neck round-bottom flask equipped with a mechanical stirrer, a packed column, Dean-Starke trap, condenser, and a thermocouple connected to a temperature control device, were added 435.5 parts of the polymer precursor of Example 1 and 64.5 parts of adipic acid. The mixture was heated to 210° C. over the course of about 2.5 hours. After 5 hours total at 210° C., the mixture had an acid number of 2.4 and a hydroxyl number of 31.5. The mixture was then cooled and discharged at 150° C. from the flask.

Example 5

To a 4-neck round-bottom flask equipped with a mechanical stirrer, a packed column, Dean-Starke trap, condenser, and a thermocouple connected to a temperature control device, were added 428 parts of the polymer precursor of Example 1 and 72 parts of adipic acid. The mixture was heated to 210° C. over the course of about 1.5 hours. The temperature of the mixture was raised to 220° C. and held for about 5.5 hours— at which point the mixture had an acid number of 1.8 and a hydroxyl number of 26.2. The mixture was cooled and discharged at 150° C. from the flask.

Example 6

To a 4-neck round-bottom flask equipped with a mechanical stirrer, a packed column, Dean-Starke trap, condenser, and a thermocouple connected to a temperature control device, were added 460.5 parts of the polymer precursor of Example 2 and 39.5 parts of adipic acid. This mixture was heated to 210° C. over the course of about 1.5 hours. The temperature of the mixture was raised to 220° C. After about 2 hours total at 220° C., the mixture had an acid number of 2.1 and a hydroxyl number of 19.4. The mixture was cooled and discharged at 150° C. from the flask.

Example 7

To a 4-neck round-bottom flask equipped with a mechanical stirrer, a packed column, Dean-Starke trap, condenser, and a thermocouple connected to a temperature control device, were added 455.5 parts of polymer precursor of Example 2 and 44.5 parts of isophthalic acid. This mixture was heated to 220° C. over the course of about 1.5 hours. After about 6.5 hours total at 220° C., the mixture had an acid number of 2.9 and a hydroxyl number of 23.2. The mixture was then cooled and discharged at 150° C. from the flask.

Example 8

To a 4-neck round-bottom flask equipped with a mechanical stirrer, a packed column, Dean-Starke trap, condenser, and a thermocouple connected to a temperature control device, were added 400 parts of the polymer precursor of Example 3 and 78.5 parts of adipic acid. This mixture was heated to 220° C. over the course of about 2.5 hours. After about 3 hours total at 220° C., the mixture had an acid number of 4.0. The mixture was then cooled and discharged at 150° C. from the flask.

Oxygen Scavenging Properties of the Polyester OS Polymers of Examples 4-8

A sample of 150 milligrams ("mg") of each of the polymer compositions of Examples 4-8 was mixed with 1,000 ppm of cobalt catalyst (6% w/w Cobalt Ten-Cex). The samples were each sealed in a 6 ml glass airtight vial containing ambient atmospheric air (i.e., about 21% oxygen). After 16 hours at ambient temperature, the amount of residual oxygen in the vials was measured using an Ocean Optics Foxy Oxygen Sensor System (available from Ocean Optics of Dunedin, Fla.), which uses fluorescence quenching to measure oxygen content. The results were measured after 2 minutes of exposure to the sensor. The results are provided below in Table 1.

TABLE 1

| Material | % Residual Oxygen at 16 Hours | | |
|---|---|---|---|
| | Vial 1 | Vial 2 | Mean |
| Example 4 | 0.9 | 1.7 | 1.3 |
| Example 5 | 2.2 | 2 | 2.1 |
| Example 6 | 2.2 | 0.6 | 1.4 |
| Example 7 | 2.4 | 4.1 | 3.3 |

TABLE 1-continued

| Material | % Residual Oxygen at 16 Hours | | |
|---|---|---|---|
| | Vial 1 | Vial 2 | Mean |
| Example 8 | 1.2 | 2 | 1.6 |
| C1* | 22 | 21.3 | 21.7 |

*An empty control vial containing only atmospheric air was included as a negative control.

As shown in Table 1, good oxygen scavenging was observed for the compositions of Examples 4-8, which each included cyclic OS groups in the form of norbornene groups.

Example 9

In the following example, an oxygen scavenging polyester polymer is produced by first making an unsaturated polyester and then reacting carbon-carbon double bonds of the polyester with cyclopentadiene.

Example 9.1

To a 4-neck round-bottom flask equipped with a mechanical stirrer, Dean-Starke trap, condenser, and a thermocouple connected to a temperature control device, were added 4839.6 parts of linseed oil fatty acid, 1160.4 parts pentaerythritol, and 6.0 parts FASCAT 4201 catalyst. The mixture was heated to 170° C. over the course of about 3 hours. After heating slowly to 200° C. and holding for 2 hours, the mixture had an acid number of 1.0 and a hydroxyl number of 157. The mixture was then cooled and discharged from the flask. 287 parts of water were collected.

Example 9.2

To a 4-neck round-bottom flask equipped with a mechanical stirrer, Dean-Starke trap, condenser, and a thermocouple connected to a temperature control device, were added 2281.2 parts of the adduct of Example 9.1 and 317 parts adipic acid. The mixture was heated to 210° C. over the course of about 6 hours. After holding for 4 hours, the mixture had an acid number of 2.4 and a hydroxyl number of 47.9. The mixture was then cooled and filtered through a 25 micron bag. 65 parts of water were collected.

Example 9.3

73.3 parts of the polymer prepared in Example 9.2 were placed in a Parr reactor with 26.7 parts of dicyclopentadiene. The reactor was heated to 240° C. over the course of 1 hour, and the pressure reached 50 psi (345 kPa). The reactor was held at 240° C. for 1 hour as the pressure became constant at 20 psi (138 kPa). The reactor was then vented and sparged with nitrogen for 1 hour, followed by vacuum at 29 inches of Hg (98.2 kPa) while holding at 240° C. The batch was then cooled and discharged.

Oxygen Scavenging Properties of the OS Polyester Polymer of Example 9

200 milligram ("mg") samples of the polyester polymer composition of Examples 9 were each mixed with 1,000 ppm of cobalt catalyst (6% w/w Cobalt Ten-Cex). The samples were each sealed in a 6 ml glass airtight vial containing ambient atmospheric air (i.e., about 21% oxygen). After 16 hours at ambient temperature, the amount of residual oxygen in the vials was measured using an Ocean Optics Foxy Oxygen Sensor System (available from Ocean Optics of Dunedin, Fla.), which uses fluorescence quenching to measure oxygen content. The results were measured after 2 minutes of exposure to the sensor. The results are provided below in Table 2.

TABLE 2

| Material | % Residual Oxygen at 16 Hours | | | |
|---|---|---|---|---|
| | Vial 1 | Vial 2 | Vial 3 | Mean |
| Example 1 Run 1 | 3.3 | 2.3 | 2.5 | 2.7 |
| Example 1 Run 2 | 1.6 | 5.1 | 4.1 | 3.6 |
| C1* | 20.8 | 21.5 | 21.4 | 21.2 |

*An empty control vial containing only atmospheric air was included as a negative control. Theoretical oxygen concentration is 20.9%.

As shown in Table 2, good oxygen scavenging was observed for a composition including the polyester polymer of Example 9 (which is believed to include cyclic OS groups in the form of norbornenc groups).

Example 10

Articles

A nylon masterbatch consisting of between 40-60 wt-% MXD6 nylon (Mitsibushi) and 60-40 wt-% PET was compounded in a twin screw extruder. In addition, a cobalt masterbatch containing PET and cobalt neodecanoate with a cobalt concentration of 5000-15000 ppm was compounded in a twin screw extruder. The two masterbatches, as well as the liquid OS polyester of Example 9 were added directly into the feedthroat of an injection molding machine, along with additional PET, to produce 38.5 gram preforms with a 38 mm finish. Comparative preforms were also made using (i) neat PET; (ii) a mixture of PET, the MXD6 nylon masterbatch and the cobalt masterbatch, and (iii) a mixture of PET, the liquid OS polyester of Example 9 and the cobalt materbatch. These preforms were then blown into 1 liter bottles and tested on a Mocon Oxtran Permeation Testing unit for Oxygen permeation, using a two-day test period. The results are shown in Table 3 below.

TABLE 3

| Bottle | Nylon Masterbatch (wt-%) | OS Polyester (wt-%) | Cobalt Masterbatch (wt-%) | Oxygen Permeation Rate (cc/pkg/day) |
|---|---|---|---|---|
| PET Control | | | | 0.063582 |
| A | 2.00 | | 0.17 | 0.052851 |
| B | | 0.30 | 0.50 | 0.011071 |
| Ex. 10 | 2.00 | 0.30 | 0.17 | 0.000917 |

As illustrated by Table 3, the bottles of Example 10 including both MXD6 nylon and the OS polyester polymer of Example 9 demonstrated significantly more effective oxygen-scavenging than bottles containing either component individually.

Example 11

Articles

Three masterbatch compositions were prepared using a twin-screw extruder: (i) a cobalt masterbatch containing PET and cobalt neodecanoate with a cobalt concentration of 5000-15000 ppm; (ii) a nylon masterbatch containing 40-60 wt-% MXD6 nylon (Mitsibushi) and 60-40 wt-% PET; and (iii) a OS polyester masterbatch containing 5-15 wt-% of the oxygen-scavenging polyester of Example 9 and 85-95 wt-% of PET. Monolayer 38 gram, 625 ml, PET beverage bottles with a 40 mm finish were blowmolded from preforms containing varying levels of the oxygen-scavenging polyester polymer of Example 9 and MXD6 nylon. The following bottles were prepared:

PET control bottles (i.e., 100 wt-% PET),
PET bottles containing 0.3 wt-% of the OS polyester of Example 9 and 0.25 wt-% of cobalt masterbatch,
11A: PET bottles containing 0.3 wt-% of the OS polyester of Example 9, 2 wt-% of the MXD6 masterbatch, and 0.25 wt-% of the cobalt masterbatch; and
11B: PET bottles containing 3 wt-% of the masterbatch of the OS polyester of Example 9, 2 wt-% of the MXD6 masterbatch, and 0.25 wt-% of the cobalt masterbatch.

The bottles were filled with nitrogen-sparged water and sealed with a glass slide using an epoxy adhesive. The oxygen concentration inside the sealed bottles stored under ambient conditions was measured over time using an OXYSENSE oxygen testing unit. The data is reported below in Table 4.

TABLE 4

| | Total Parts Oxygen (in parts per billion) | | | |
|---|---|---|---|---|
| | | Example 11 | | |
| Days | PET Control Bottle (100 wt-% PET) | PET Bottle with Ex. 9 OS Polyester | 11A: Bottles with Ex. 9 OS Polyester + MXD6 | 11B: Bottles with Ex. 9 OS Polyester + MXD6 |
| 0 | 198 | 142 | 137 | 294 |
| 1 | 291 | 164.5 | 58.5 | 137 |
| 4 | 416 | 83.5 | 37.5 | 36 |
| 12 | 855 | 95.5 | 38 | 37 |
| 15 | 1032.5 | 132.5 | 38 | 36.5 |
| 18 | 1180 | 196 | 37 | 36.5 |
| 21 | 1328 | 262.5 | 37 | 36.5 |
| 28 | 1646.5 | 427.5 | 35 | 34.5 |
| 35 | 1984.5 | 633.5 | 27 | 26.5 |
| 42 | 2292.5 | 823.5 | 36 | 35.5 |
| 50 | 2639 | 1060.5 | 31 | 31.5 |
| 56 | 2818.5 | 1198 | 26.5 | 27 |
| 64 | 3208 | 1435.5 | 31.5 | 31.5 |
| 70 | 3271.5 | 1589.5 | 31 | 31.5 |
| 77 | 4036 | 2318 | 27.5 | 31 |

As shown in the data of Table 4, the concentration of oxygen present in the sealed PET control bottle steadily increased from days 0 to 77. The oxygen concentration of the PET bottle containing the oxygen-scavenging polymer of Example 9 without any MXD6 nylon initially decreased between days 1 and 4, but then increased between days 12 and 77. In contrast, the concentration of oxygen present in bottles 11A and 11B of Example 11 rapidly decreased between days 0 and 4 and remained at a low level out to day 77. Thus, the bottles of Example 11 containing both the bicyclic-functional polyester of Example 9 and MXD6 nylon exhibited a superior oxygen-scavenging profile.

Table 4 above does not include a PET bottle containing MXD6 nylon as the only scavenging polymer because such tests were not run. However, in a separate set of bottle experiments, the concentration of oxygen present in sealed PET bottles (monolayer 38 gram, 500 ml beverage bottles with a 38 mm finish) made from a MXD6 nylon/PET masterbatch and a cobalt/PET masterbatch (similar to that used above for Table 4) were analyzed using an Orbisphere oxygen sensor system. The bottles did not include any oxygen scavenging polymers in addition to the MXD6 nylon. The data for PET bottles containing varying levels of the MXD6 nylon/PET masterbatch is provided below in Table 5.

TABLE 5

| | Total Parts Oxygen (in parts per billion) | | | |
|---|---|---|---|---|
| days | PET Control Bottles (100 wt-% PET) | PET Bottles including 2 wt-% MXD6/PET masterbatch | PET Bottles including 3 wt-% MXD6/PET masterbatch | PET Bottles including 4 wt-% MXD6/PET masterbatch |
| 0* | 0.2 | 0.2 | 0.2 | 0.2 |
| 8 | 0.86 | 0.58 | 0.28 | 0.19 |
| 43 | 2.75 | 1.50 | 0.69 | 0.31 |
| 70 | 3.96 | 2.23 | 0.94 | 0.60 |
| 135 | 5.53 | 2.68 | 1.15 | 0.57 |
| 171 | 6.45 | 3.01 | 1.08 | 0.39 |

*Estimated.

As illustrated by Table 5, the PET bottles containing varying levels of MXD6 nylon each exhibited a "lag" in oxygen-scavenging. In contrast, the PET bottles of Example 11 that included 4 wt-% of the MXD6 nylon/PET masterbatch in combination with the OS polyester polymer of Example 9 did not exhibit any such lag.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A composition comprising:
   an oxygen-scavenging component including:
      a polyamide polymer having a polyamide oxygen-scavenging group, and
      a polyester polymer having a condensation backbone and a bicyclic oxygen-scavenging group having at least one double bond located between atoms of a ring,
      wherein the polyamide polymer constitutes from about 0.5 to about 5 wt-% of the composition, and the polyester polymer constitutes from about 0.25 to about 2 wt-% of the composition; and
   an oxidation catalyst.

2. The composition of claim 1, wherein the polyamide oxygen-scavenging group and the bicyclic oxygen-scavenging group are present on different polymers.

3. The composition of claim 1, wherein the bicyclic group comprises a structure represented by the nomenclature expression:

bicyclo[x,y,z]alkene;

wherein:
   x is 2 or more, and
   y and z are each at least 1.

4. The composition of claim 3, wherein:
   x is 2 or 3, and
   y and z are independently 1 or 2.

5. The composition of claim 1, wherein the bicyclic group comprises bicyclo[2.1.1]hexene, bicyclo [2.2.1]heptene, bicyclo[2.2.1]heptadiene, bicyclo [2.2.2]octene, bicyclo [2.2.2]octadiene, or a mixture thereof.

6. The composition of claim 1, wherein the concentration of the polyamide polymer in the composition is greater than the concentration of the polyester polymer.

7. The composition of claim 1, wherein the polyester polymer comprises polyethylene terephthalate.

8. The composition of claim 1, wherein the bicyclic group comprises a pendant group attached to the condensation backbone.

9. The composition of claim 8, wherein the pendant group is a reaction product of ingredients including an unsaturated fatty acid.

10. The composition of claim 1, wherein the polyamide group comprises a structural unit represented by the below structural formula (I):

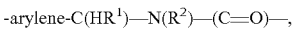

wherein $R^1$ and $R^2$ independently denote one of a hydrogen atom, a substituted or unsubstituted alkyl group, a substituted or unsubstituted cycloalkyl group, a substituted or unsubstituted aryl group, or a substituted or unsubstituted alkenyl or cycloalkenyl group.

11. The composition of claim 1, wherein the composition comprises at least about 25 parts per million of the oxidation catalyst.

12. The composition of claim 11, wherein the oxidation catalyst comprises one or more transition metals, transition metal complexes, or mixtures thereof.

13. The composition of claim 1, wherein the oxidation catalyst comprises a cobalt catalyst.

14. A packaging article, comprising the composition of claim 1.

15. The packaging article of claim 14, wherein the article comprises a single-layer packaging article.

16. The packaging article of claim 14, wherein the packaging article comprises a multi-layer packaging article.

17. The packaging article of claim 14, wherein the article comprises about 15 wt-% or less of the oxygen-scavenging component.

18. A method, comprising:
   providing:
      a conjugated diene component, and
      an unsaturated component;
   forming a first oxygen-scavenging polyester having a condensation backbone and that includes a bicyclic group that is a Diels-Alder reaction product of the above components, wherein the bicyclic group includes at least one ring having a double bond located between atoms of the ring; and
   forming an oxygen-scavenging composition that comprises:
      (i) the first oxygen-scavenging polyester;
      (ii) a second oxygen-scavenging polymer having at least one of:
         (a) a structural unit represented by the below structural formula (I):

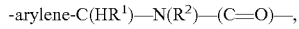

wherein $R^1$ and $R^2$ independently denote one of a hydrogen atom, a substituted or unsubstituted alkyl group, a substituted or unsubstituted cycloalkyl group, a substituted or unsubstituted aryl group, or a substituted or unsubstituted alkenyl or cycloalkenyl group; or
         (b) an unsaturated oxygen-scavenging group that includes at least one carbon-carbon double bond with a heat of hydrogenation of less than or equal to that of cyclohexene; and (iii) an oxidation catalyst;
wherein the first oxygen-scavenging polyester constitutes from about 0.25 to about 2 wt-% of the oxygen-scavenging composition, and the second oxygen-scavenging polymer constitutes from about 0.5 to about 5 wt-% of the oxygen-scavenging composition.

19. A composition comprising:
an oxygen-scavenging component that includes:
a first oxygen-scavenging polyester having a condensation backbone and comprising a cyclic or bicyclic oxygen-scavenging group having at least one carbon-carbon double bond located between atoms of a ring, wherein:
the carbon-carbon double bond has a heat of hydrogenation of at least 33 kcal/mole, and
a second oxygen-scavenging polymer comprising:
(i) one or more of a structural unit represented by the formula:

-arylene-C(HR$^1$)—N(R$^2$)—(C=O)—, wherein R$^1$ and R$^2$ independently denote one of a hydrogen atom, a substituted or unsubstituted alkyl group, a substituted or unsubstituted cycloalkyl group, a substituted or unsubstituted aryl group, or a substituted or unsubstituted alkenyl or cycloalkenyl group, or
(ii) an unsaturated oxygen-scavenging group that includes at least one carbon-carbon double bond with a heat of hydrogenation of 32 kcal/mole or less; and
an oxidation catalyst;
wherein the first oxygen-scavenging polyester constitutes from about 0.25 to about 2 wt-% of the oxygen-scavenging composition, and the second oxygen-scavenging polymer constitutes from about 0.5 to about 5 wt-% of the oxygen-scavenging composition.

20. The composition of claim 19, wherein the second oxygen-scavenging polymer comprises one or more of the structural unit represented by the formula -arylene-C(HR$^1$)—N(R$^2$)—(C=O)—.

* * * * *